(12) United States Patent
Tayeb et al.

(10) Patent No.: US 10,983,894 B2
(45) Date of Patent: Apr. 20, 2021

(54) AUTONOMOUSLY ADAPTIVE PERFORMANCE MONITORING

(71) Applicants: Intel Corporation, Santa Clara, CA (US); Jamel Tayeb, Beaverton, OR (US); Robert F. Kwasnick, Palo Alto, CA (US)

(72) Inventors: Jamel Tayeb, Beaverton, OR (US); Robert F. Kwasnick, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/306,002

(22) PCT Filed: Jul. 22, 2016

(86) PCT No.: PCT/US2016/043693
§ 371 (c)(1),
(2) Date: Nov. 30, 2018

(87) PCT Pub. No.: WO2018/017133
PCT Pub. Date: Jan. 25, 2018

(65) Prior Publication Data
US 2019/0213100 A1 Jul. 11, 2019

(51) Int. Cl.
*G06F 11/34* (2006.01)
*G06F 11/30* (2006.01)
*H04Q 9/00* (2006.01)

(52) U.S. Cl.
CPC ...... *G06F 11/3495* (2013.01); *G06F 11/3058* (2013.01); *G06F 11/3072* (2013.01);
(Continued)

(58) Field of Classification Search
CPC ............ G06F 11/3495; G06F 11/3058; G06F 11/3072; G06F 11/3089; G06F 11/3096;
(Continued)

(56) References Cited

U.S. PATENT DOCUMENTS 6,609,083 B2 * 8/2003 Enck ................... G06F 11/3409
702/179
7,047,090 B2 5/2006 Turicchi, Jr. et al.
(Continued)

FOREIGN PATENT DOCUMENTS

DE 112016007091 4/2019
WO WO-2018017133 A1 1/2018

OTHER PUBLICATIONS

"International Application Serial No. PCT/US2016/043693, International Search Report dated Apr. 19, 2017", 3 pgs.
(Continued)

*Primary Examiner* — Franklin D Balseca
(74) *Attorney, Agent, or Firm* — Schwegman Lundberg & Woessner, P.A.

(57) ABSTRACT

System and techniques for autonomously adaptive performance monitoring are described herein. A device state may be measured. A measurement set may be located using the device state. A difference set between the measurement set and a current measurement group may be identified. The current measurement group may be changed into a next measurement group using the difference set. A measurement package created during at least one sample period of the next measurement group may be sent to a remote device.

24 Claims, 7 Drawing Sheets

(52) U.S. Cl.
CPC ...... *G06F 11/3089* (2013.01); *G06F 11/3096* (2013.01); *H04Q 9/00* (2013.01); *G06F 2201/81* (2013.01)

(58) Field of Classification Search
CPC .. G06F 2201/81; H04Q 9/00; H04Q 2209/00; H04Q 2209/80; H04Q 2209/82; H04Q 2209/823
See application file for complete search history.

(56) References Cited

U.S. PATENT DOCUMENTS

| | | | |
|---|---|---|---|
| 8,164,461 B2 * | 4/2012 | Bischoff | G08B 25/016 340/573.1 |
| 8,381,039 B1 | 2/2013 | Osiecki et al. | |
| 8,402,174 B2 * | 3/2013 | Memmott | H04L 67/125 710/15 |
| 8,712,370 B2 | 4/2014 | Ryan et al. | |
| 9,314,666 B2 * | 4/2016 | Canavan | A61B 5/681 |
| 10,073,753 B2 * | 9/2018 | Boyapalle | G06F 11/3452 |
| 2007/0003023 A1 * | 1/2007 | Rolia | H04L 43/00 379/32.01 |
| 2014/0379889 A1 | 12/2014 | Faraboschi et al. | |

OTHER PUBLICATIONS

"International Application Serial No. PCT/US2016/043693, Written Opinion dated Apr. 19, 2017", 7 pgs.
"International Application Serial No. PCT US2016 043693, International Preliminary Report on Patentability dated Jan. 31, 2019", 9 pgs.

* cited by examiner

AUTONOMOUSLY ADAPTIVE PERFORMANCE MONITORING

CLAIM OF PRIORITY

This application is a U.S. National Stage Filing under 35 U.S.C. 371 from International Application No. PCT/US2016/043693, filed on Jul. 22, 2016, and published as WO 2018/017133, which application is incorporated herein by reference in its entirety.

TECHNICAL FIELD

Embodiments described herein generally relate to computer monitoring systems and more specifically to autonomously adaptive performance monitoring.

BACKGROUND

Computer performance monitoring involves the measurement and compilation of metrics from various components in a computer system. The results may be used to improve performance by identifying areas that are underperforming, failing, etc. For example, to design integrated circuits and electronic systems competitively, original equipment manufacturers may use data collected on end user devices, feed it back into the engineering process, and used for understanding computer device requirements to improve the user experience (UX), such as in cost, reliability, power use, environmental impact, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
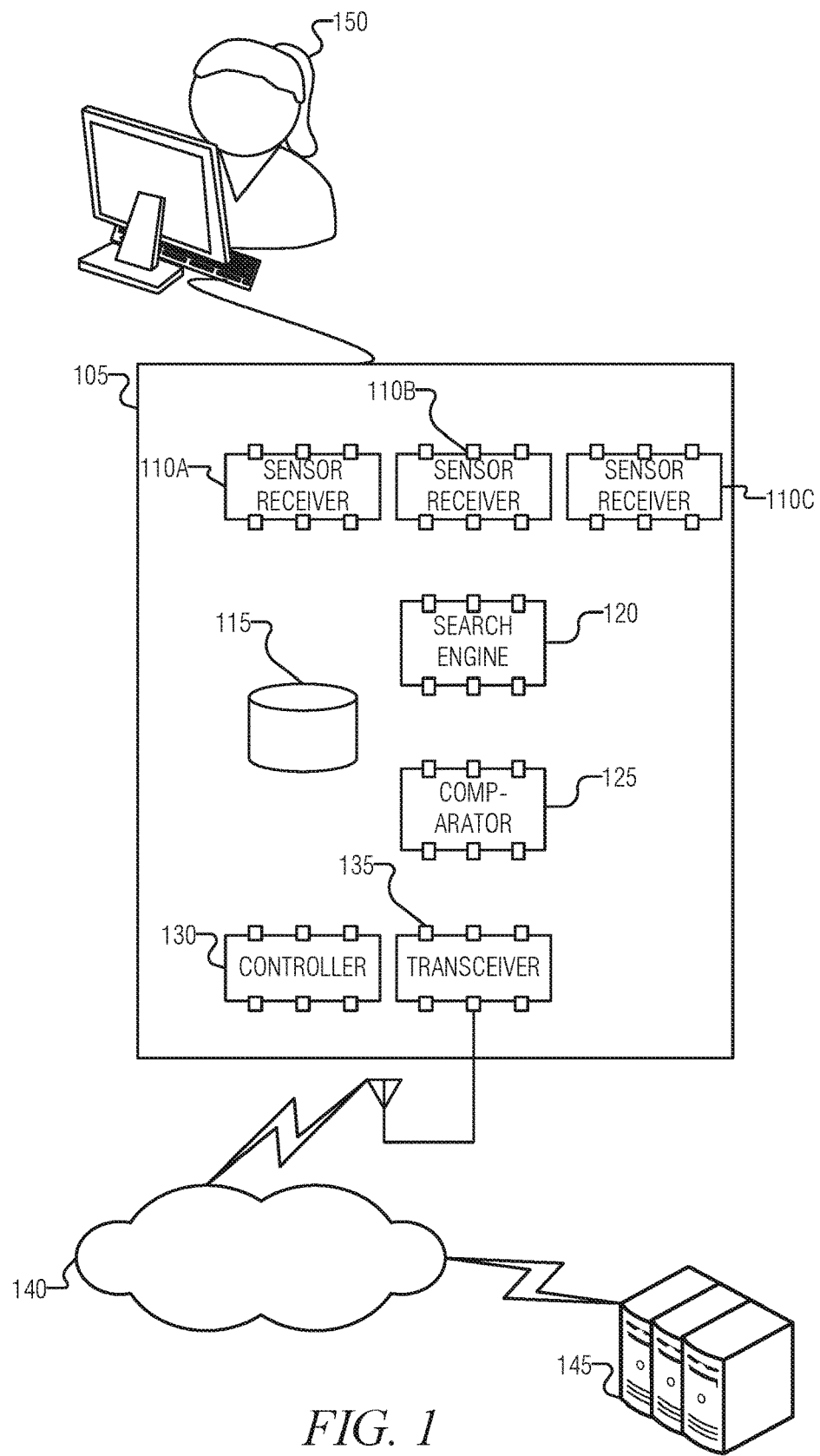
FIG. 1 is a block diagram of an example of an environment including a system for autonomously adaptive performance monitoring, according to an embodiment.

Individual device usage is often unique, reflecting the varied use of different workloads (e.g., applications, hardware, etc.). Characterizing different workloads may require different metrics. For example, because a search in a database doesn't stress a device the same way as playing a video, understanding these workloads may involve the collection and the analysis of different metrics, such as input/output (IO) vs a graphics processing unit (GPU) utilization. However, each metric that is collected generally involves use of computing resources, such as central processing unit (CPU) time, traffic on a bus, storage space, etc. If the device resource burden is too high, the device may be unsuitable for its intended use (e.g., too slow) that may lead to an unsatisfactory user experience. Thus, practically, every metric desired by product designers may not be obtained. That is, developers must generally choose a limited set of metrics to gather.

Generally, a field data collector (e.g., in a user device), with restricted device resources, collect only a limited "envelop" set of data. In one class of current systems, a range of device or application metrics are captured and provided (e.g., uploaded) to developer servers. Data mining (e.g., analysis) may then be performed on the provided data. Often, in wide scale deployments, the systems on the client devices are pre-configured and do not change (e.g., static). Some of these static deployments may be replaced by updates pushed to the user device, however, they are not autonomously dynamic, instead operating as software updates or installations rather than changing during normal operation. Even if timely static reconfigurations were implemented, the initial problem is the same: the success of the data collection campaign depends on the estimated projection of the assumed future use of the systems. That is, the designers of the static configuration must predict which metrics are important before capturing the metrics. Further, such updates often involve stopping the system, changing the collectors, and then restarting the system, provoking the loss of data and context for collected data.

To comprehend all possible usages, generally the current systems collect as much data as possible, within the allotted device resources—the allocation is limited so that the system does not impact the user experience by consuming too many resources. Example current data collection systems—including those that may operate at potentially very large scale—may include data collection and analysis (DCA), trace analyzer and collector, or system environment monitoring agent (SEMA), or the like. These systems attempt to capture metrics pertinent to a wide range of use cases, including extreme use cases, but are often inefficient for most users.

For different users on the same device, or different devices—such as servers, personal computers, smart phones, tablets, internet of things (TOT) sensors, smart watches, or any other computer system—are considered, the current systems exhibit a least-common-denominator approach to collection, and hence are not optimized for all users. Choosing this limited set of metrics to collect is a difficult problem, because it attempts to capture a small set of metrics that are useful to a wide range of usage scenarios, such as gaming, media (e.g., pictures, movies, music, virtual reality, etc.) consumption, web browsing, office productivity, among others, as well as a range engineering interests (e.g., are specific features of the device or chip, such as the graphics cores, being used as expected, intensely, not at all, etc.). Compounding the problem, a given device may undergo several changes throughout a day, such as office productivity work in the day, web surfing in the evening, and media consumption on the weekend. Even if static reconfigurations were possible, the initial problem is the same: the success of the data collection campaign depends on the estimated projection of the assumed future use of the systems.

To address the issues presented above, a system for autonomously adaptive performance monitoring may be used. The system collects, within allotted resources, a set of metrics that characterize individual macro activities. The metric set is autonomously and dynamically adapted over time to match an activity in order to improve data collection goals given limited resources. In an example, the adaptability of the metric set is response to times as short as a second. In order to achieve the autonomously adaptive performance monitoring, a few of the following principles may be used:

1. Self-monitoring and control: the system monitors and limits its own use of system resources; and the system, applies corrective actions if resource thresholds are exceeded, up to and including self-termination.
2. Dynamic reconfiguration: the system may add or remove metrics to the collected metrics set without stopping and restarting the collectors for the metrics; dynamic reconfiguration is adjusted to reduce resource impact by reducing load of the collectors on the monitored device; and dynamic reconfiguration ensures that metrics are stable over a minimum period of time so data is useful from an analytics point of view. Rules-based heuristics: system components may evaluate collected data in real-time against a rule store to govern system behavior (e.g., to change collectors or collector parameters); active rules add or subtract metrics from the current metrics set. Although a the number of complexity of rules is not limited, rule evaluation overhead adds to the system's overhead and thus may be practically limited by the system's self-regulation of resource use.

Implementing the autonomously adaptive performance monitoring as described herein reduces the burden on designers in selecting appropriate metrics while still using limited device resources and covering a wide variety of use cases by continuously self-adapting data collection to the device state—e.g., user's actions, applications running or interacted with by the user, device configuration changes (e.g., what's plugged in, changes in sub-systems, etc.), among other things. Thus, the described system at least takes into account one or more of device specific usage, device configuration, or limitations of the size or relevance of collected data.

By using the device state based dynamism in collector configuration, the instant system may select a good set of metrics to capture the device's activity, as that activity changes in time, without negatively impacting the user experience more than current collection systems. In an example, the data collection is not stopped during these dynamic changes to metric collection, and all collected data over time shares the same context. Data analysts select a broad set of metrics and associate those metric sets to selection/de-selection routines, allowing collection to fully use the allotted device resource envelop to collect metrics pertinent to a current use of the device. Because the metric collection changes do not involve user or developer interaction, data collection is not interrupted—data and context are maintained—and data collection may be more frequently and optimally changed to address data collection needs of developers, users, monitoring agents, or other data consumers.

FIG. 1 is a block diagram of an example of an environment 100 including a system 105 for autonomously adaptive performance monitoring, according to an embodiment. The system 105 may include one or more sensor receivers 110A, 110B, or 110C, a data store 115, a search engine 120, a comparator 125, a controller 130, and a transceiver 135. These components are implemented in computer hardware such as that described below with respect to FIG. 6 (e.g., circuits). When in operation, the system 105 may be communicatively coupled to a remote controller 145 via a network 140.

The sensor receiver 110 is arranged to measure a state of a device via a sensor. The sensor receiver 110 may be a sensor itself or coupled (e.g., wired or communicatively when in operation) to a sensor. The measured state of the device is an operational state defined by system 105 designers as relevant to a particular use case of the device. Example states may include INTERNET or BATCH to respectively pertain to a user browsing the web or a server running a nightly batch process. The state is not simply an emergent property of the device, such as running a particular application, but is rather one of a plurality of pre-defined choices determinable by the sensor receiver 110. Additional examples are provided below.

In an example, the sensor is interrupt driven. An interrupt driven sensor operates to collect data and provides a signal when the data is ready to collect, such as via a hardware interrupt signal or the like. Such sensors may increase efficiency by refraining from using device resources until the data is ready to be consumed. In an example, the sensor is poll driven. In a poll driven sensor, the receiver 110 periodically checks with the sensor to determine whether or not data is available. Poll driven sensors may exchange some device resource efficiency (e.g., because the polling process may make a request when data is not available) with design simplicity.

In an example, the sensor is an environmental sensor arranged to measure an ambient condition of the device. Such ambient conditions are external to the device itself but may be indicative of a use case. In an example, the sensor is a user presence detector, and wherein the state is a presence of a user 150. In this example, the ambient condition is whether or not a user 150 is in a position to use the device. Such as use case may indicate an interactive use by the user 150 rather than idle or batch processing. The user presence detector may include one or more of a number of detection technologies, such as audio, ultrasound, radar, cameras, etc. In an example, the presence detector is a camera and classifier. Here, the classifier is configured (e.g., trained) to identify the 150 from still or moving imagery collected by the camera. In an example, the camera is a depth camera. In an example, the sensor is a thermometer. Such external thermal information may be indicative of an environmental hardship to which alternative internal monitoring is relevant versus a standard climate controlled environment.

In an example, the sensor is a hardware monitor. A hardware monitor is built into the device hardware by a component manufacturer or otherwise added to directly observe the physical state of the device components. In an example, the hardware monitor is a component thermometer, such as may be on a CPU, GPU, or the like. In an example, the hardware monitor is a power meter (e.g., it measures power consumption by a component. In an example, the hardware monitor is a microphone, which may indicate activity, for example, in a device cooling system (e.g., a fan), in a hard drive, or other component with moving parts.

In an example, the sensor is a process monitor. Such as process monitor may include an interface to access an OS process table, an IO request queue, or the like. In an example, the process monitor provides a foreground process. As used here, a foreground process is a process (e.g., program, thread, application, etc.) with a higher priority than other processes. In an example, the foreground process is a user level process as opposed to a system or OS level process which may have a higher priority at a given time. The exclusion of OS processes in this case may provide a better use case state determination because the user level process is probably indicative of what the user 150 intends to use the device even if a current system task is prioritized at a given moment. In an example, the process monitor provides only the foreground process. In an example, the process monitor provides a ranked set of currently running processes. In an example, the set is ranked based on resource use. In an example, the set is ranked based on a user 150 defined application priority table.

The search engine 120 is arranged to locate a measurement set (e.g., from the data store 115) based on a device state. As noted above, the state is indicative of a user case pertinent to a developer or the user 150. The search engine 120 uses that indication to find the measurement set, the set of measurements (e.g., metrics) the developer or the user 150 would like to perform given a particular state. In an example, to locate the measurement set, the search engine 120 is arranged to receive the state, search the data store 115 for a record including a component that matches the state and corresponds to the measurement set, and return the measurement set. In an example, the record includes a set of states and a class. in this example, the record corresponds to the measurement set based on the class. Thus, the state may be indexed to a class. The search engine 120 then performs an additional search for the measurement set using the found class. For example, if the device had two internet browsers installed, the process monitor may return a foreground process that is one of the two installed browsers. The search engine 120 may take the foreground process identification from the sensor receiver 110 and use it to query the data store 115. The search engine 120 matches the foreground process name to a record including the class INTERNET. The search engine 120 then performs an additional query on the data store 115 and matches the class INTERNET to one or more measurements to obtain the measurement set. Thus, without regard to which of the two browsers is being used, the same measurement set is obtained.

The comparator 125 is arranged to identify a difference set of measurements between a current measurement group and the measurement set. In an example, to identify the difference set of measurements, the comparator 125 is arranged to find measurements in the measurement set that are not in the current measurement group. That is, the measurement set includes at least one measurement that the current measurement group is not collecting. In an example, to identify the difference set of measurements, the comparator 125 is arranged to find measurements in the current measurement group that are not in the measurement set. Thus, in an example, the comparator 125 determines which measurements would need to be added to the current measurement group and which measurements would need to be removed from the current measurement group in order to have the current measurement group conform (e.g., match) the measurement set.

The controller 130 is arranged to change the current measurement group with the difference set to create a next measurement group. As noted above, where the comparator 125 determines the difference set, the controller 130 implements the change to the current measurement group such that the next measurement group (also called the target) is equivalent to the measurement set. In an example, to change the current measurement group with the difference set, the controller 130 is arranged to add, to the next measurement group, the measurements in the measurement set (e.g., "add" measurements in the difference set) that are not in the current measurement group. In an example, to change the current measurement group with the difference set, the controller 130 is arranged to remove, from the next measurement group, the measurements in the current measurement group that are not in the measurement set (e.g., "remove" measurements in the difference set. Changing the current measurement group is different than simply replacing the current measurement group, as is the case in a traditional update, because measurements in the union of the measurement set and the current measurement group remain unaffected by the change. In an example, to change the current measurement group, the controller 130 is arranged to refrain from interrupting collection by measurements that do not change between the current measurement group and the next measurement group. By allowing the unchanging measurements to continue collecting data, unaffected, allows the context of those collections to be preserved. In an example, the controller 130 is arranged to delay the removal of a measurement in the difference set when that measurement has been operating below a threshold period for a valid measurement. Thus, relevant data is not lost simply because the device state changes rapidly.

As noted above, the limited resource available to the system 105 are allocated in order to avoid undue impact on the device's performance, which may impact the user's experience. In an example, the controller 130 is arranged to modify the next measurement group based on a device load. In an example, the controller 130 is arranged to remove at least one measurement from the next measurement group in response to the load being above a threshold. This example address the situation when the measurement set includes too many measurements given the allocated device resources.

Device load may include any one or combination of processor (e.g., CPU, GPU, etc.) utilization, memory utilization, storage utilization, bus utilization, network utilization, or other IO utilization. In an example, the at least one measurement is selected for removal based on a rank. This is opposed to a random selection of a measurement to remove. In an example, each measurement in the next measurement group has a rank. The rank may be based on one or a combination of factors, such as measurement device resource utilization, importance as defined by the developer, historical use (e.g., the rank shrinks the more often the measurement has been used in the past or the recent past), etc.

In an example, the threshold is determined based on the state. Thus, each state of the plurality of states may include a threshold. This allows for greater data gathering when, for example, the user 150 is not interacting with the device and thus will not experience a lag if greater device resources are used by the system 105. The greater flexibility allowed by dynamic thresholds may improve the user experience while allowing greater data gathering for performance monitoring. In an example, the controller 130 is arranged to add at least one measurement to the next measurement group in response to the load being below a threshold. In this example, additional measurements may be added or kept when there is room in the allocated device resources.

The transceiver 135 is arranged to communicate, to the remote controller 145, a measurement package created during at least one sample period of the next measurement group. Thus, the dynamic changes to the performance monitoring are immediately available to the remote controller 145. In an example, the transceiver 135 is arranged to receive an update to the measurement set, or other aspects of the system 105 stored, for example, in the data store 115 and used to govern the system 105. In an example, the update includes a change to a list of measurements for the measurement set.

The following is an example of the system 105 in operation, including additional examples for various features identified above. Periodically, the system 105 uses predefined metrics (e.g., from the sensor receiver 110) to classify the use of the device. For example, the foreground application name is looked-up in a table (an example of which is provided below) to find the corresponding use class.

| Foreground Application Name | Class |
|---|---|
| iexplore.exe | INTERNET |
| pmbdeviceinfoprovider.exe | MEDIA |
| pmbvolumewatcher.exe | MEDIA |
| iastoricon.exe | UTIL |
| reader_sl.exe | OFFICE |
| wmplayer.exe | MEDIA |
| googletoolbarnotifier.exe | INTERNET |
| winword.exe | OFFICE |
| ... | ... |
| acrord32.exe | OFFICE |
| defrag.exe | UTIL |
| mpcmdrun.exe | ANTI_VIRUS |
| mrtstub.exe | ANTI_VIRUS |
| psiservice_2.exe | UTIL |
| mpsigstub.exe | ANTI_VIRUS |
| googletoolbaruser_32.exe | INTERNET |
| googletoolbaruser_32.exe | ANTI_VIRUS |

This use class may also be called the target use class to differentiate it from a current use class defining the measurements being collected. If the target use class is the same as the current use class, data collection continues without change until the next period that a state change is recognized. Limiting state changes to defined periods address possible thrashing issues during periods in which the state may change rapidly but fail to provide adequate data gathering time.

When the target use class is different than the current use class, the system 105 looks-up the target use class to get the target metrics set from a table. The target metrics set is the designated set of metrics to characterize the target use class. The table below is an example use class to metrics set data structure.

| Class | Metrics Set |
|---|---|
| ANTI_VIRUS | CPU use, Storage BW, Storage Latency |
| INTERNET | CPU use, Network BW, Network Latency |
| MEDIA | CPU use, GPU use, Network Latency |
| OFFICE | CPU use, Storage BW, Storage Latency, Network Latency |
| UTIL | CPU use |

The system 105 computes the difference between the current metrics set and the target metrics set. This difference is expressed as metrics to be removed and metrics to be added to the current metrics set. For example, when targeting an OFFICE use from a current INTERNET use, the metrics difference is given in the following table:

| | Class | Metrics Set |
|---|---|---|
| Current | INTERNET | CPU use, Network BW, Network Latency |
| Target | OFFICE | CPU use, Storage BW, Storage Latency, Network Latency |
| Difference | | Remove: Network BW<br>Add: Storage BW, Storage Latency |

The system 105 self-configures using the list of metrics to be added and metrics to be removed (the "Difference" row above). The new data set is collected until the next period when a possible state change may again occur.

Thus, data collection by the system 105 continuously self-adapts to device state. Therefore the system 105 collects a good set of metrics to describe device activity across different use cases and users. Moreover, because data collection is not stopped needlessly, all collected data over time shares the same collection context. Thus, the system 105 allows data analysts to select a broad set of metrics with corresponding selection or de-selection directives to maximize the allotted device resource envelop and the pertinence of the collected metrics to the variety of use cases that are, or may be, experience by the device.

Figure 2:
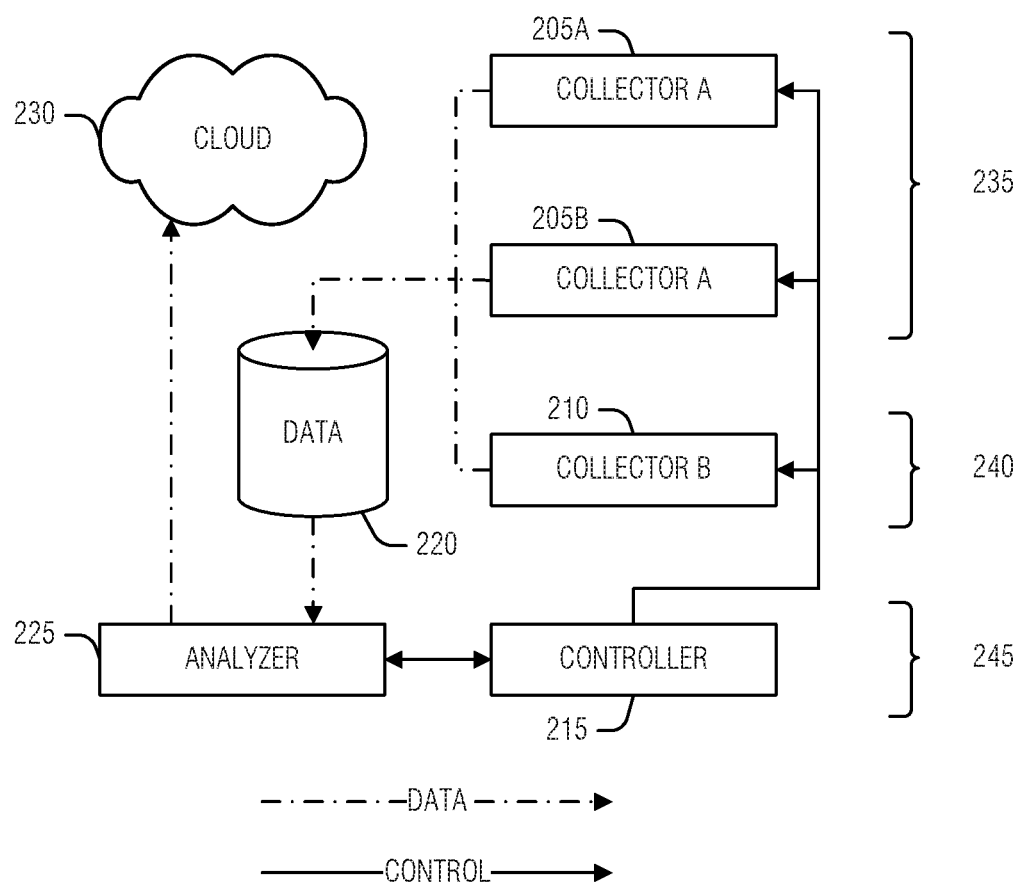
FIG. 2 illustrates an example of control and data flow in a system for autonomously adaptive performance monitoring, according to an embodiment.

FIG. 2 illustrates an example of control and data flow in a system for autonomously adaptive performance monitoring, according to an embodiment. The illustrated system includes a first collector type (e.g., collector A), illustrated as collectors 205A and 205B, a second collector type (e.g., collector B), illustrated as collector 210, a controller 215, and analyzer 225, a data store 220, and a cloud 230. As illustrated the solid lines indicate a control flow and the dashed lines indicate a data flow.

The collectors and controller 215 operate in different privilege levels of a device. The privilege level 235 correspond to user privileges, the privilege level 240 corresponds to an elevated privilege level (e.g., super user), and the privilege level 245 corresponds to yet further elevated privileges (e.g., a system or secure privilege level). As illustrated, the controller 215 provides controller to the collectors 205A, 205B, and 210, including determining whether those collectors operate at all, when they will operate, or the parameters (e.g., what data to collect) used to configure an operation. The collectors 205A, 205B, and 210 produce metrics that are then stored in the data store 220. The collected metrics may be obtained (e.g., retrieved or received) by the analyzer 225 to produce performance logs. These performance logs may then be communicated to a remote controller, or other system, in the cloud 230 (e.g., remote computer systems).

Figure 3:
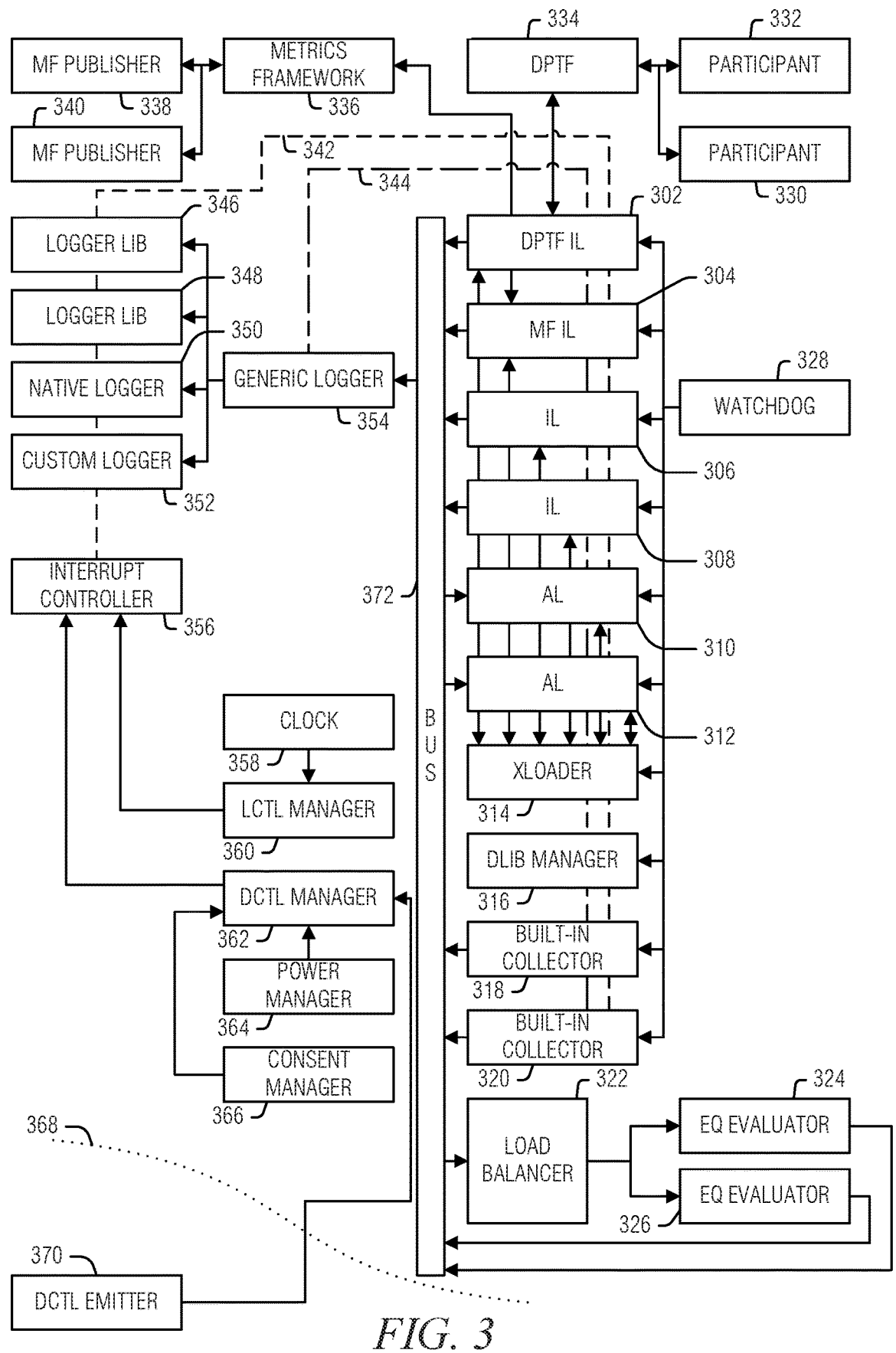
FIG. 3 illustrates an example arrangement of components to implement autonomously adaptive performance monitoring, according to an embodiment.

FIG. 3 illustrates an example arrangement of components to implement autonomously adaptive performance monitoring, according to an embodiment. The arrangement of FIG. 3 also illustrates communication links between the components, which may be hard (e.g., via an application specific integrated circuit or the like) or soft (e.g., hardware configured during operation by software). Communications are carried out on one of the input bus 372, the log control (LSTL) bus 344, the device control (DCTL) bus 342, or direct connection (illustrated via solid lines with arrows).

The watchdog 328 monitors collection processes, performing services such as starting, stopping, error control, or the like. The collection processes may include one or more of a metrics framework (MF) input library (IL) 304, a dynamic power and thermal framework (DPTF) IL 302, other input libraries (e.g., IL 306 or IL 308), actuator libraries (ALs) such as AL 310 or AL 312, and built-in collectors of the device, such as built-in collector 318 or built-in collector 320. To clarify, an IL is a component arranged to capture a set of metrics. For example, an IL may be a CPU analyzer to obtain and produce CPU metrics. Built-in collectors may include such things as a power analyzer, operating system or hardware counters, software telemetry, equation (EQ) selectors, or power to inputs correlators. In an example, an AL manages a collection of ILs based on the IL output. The built-in collectors are components that may be static (e.g., generally not configurable). In contrast, the ILs and ALs are dynamic, being loaded or unloaded (e.g., taken in or out of operation) by the XLoader 314. Thus, the XLoader 314 modifies the measurement group as described above, the ILs and ALs being that measurement group. As the ILs and ALs are dynamically invoked, the device library (DLIB) manager 316 provides the necessary resources (e.g., code) to the XLoader 314.

DPTF participants 332 and 330, which may include such things as a CPU, memory, a three dimensional camera, or other devices, provide metrics to the DPTF component 334 which in turn feeds the DPTF IL 302. Similarly, MF publishers 338 and 340, provide metrics to the MF component 336, which in turn feeds the ML IL 304. Example MF publishers may include SEP or GPA.

The collectors produce metrics from observed device behavior and put (e.g., post, publish, etc.) that data on the input bus 372. The EQ evaluators 324 and 326 accept data from the input bus 372, modify that data (e.g., perform an average, derive a mean, etc.) and place it back on the input bus 372. Thus, any set of metrics on the input bus 372 may be combined in an equation. The EQ evaluators' results may then become new metrics available on the input bus 372 and consumed by any agent connected to the input bus 372. As illustrated, a load balancer 322 may be used to divide the data work between a collection of EQ evaluators, or other evaluation units.

The generic logger 354 receives output from the input bus 372, the LCTL bus 344. The generic logger 354 may normalize or package the received data into a standard format (e.g., encoding, size, manifest, etc.) and provide the processed data to one or more members of a collection of loggers, such as a logger libraries 346 or 348 (e.g., that provide data transforms, aggregation etc.), a native logger 350, or other custom logger 352. Thus, the dynamic IL and AL data is logged.

The interrupt controller 356 operates on the DCTL bus 342 and may provide logging events to the ILs for event based metrics gathering. The interrupt controller 356 may receive control operations (e.g., signals) from the LCTL manager 360 or the DCTL manager 362. The LCTL manager 360 may receive input from a clock 358. The DCTL manager 362 may receive control input from either or both of a power manager 364 or a consent manager 366. The consent manager 366 accepts user based consent directives as to the nature or timing of when device data may be collected. The DCTL manager 362 may also receive control inputs from a DCTL emitter 370 operating on the other side of a process boundary 368 as the rest of the components discussed above.

Figure 4:
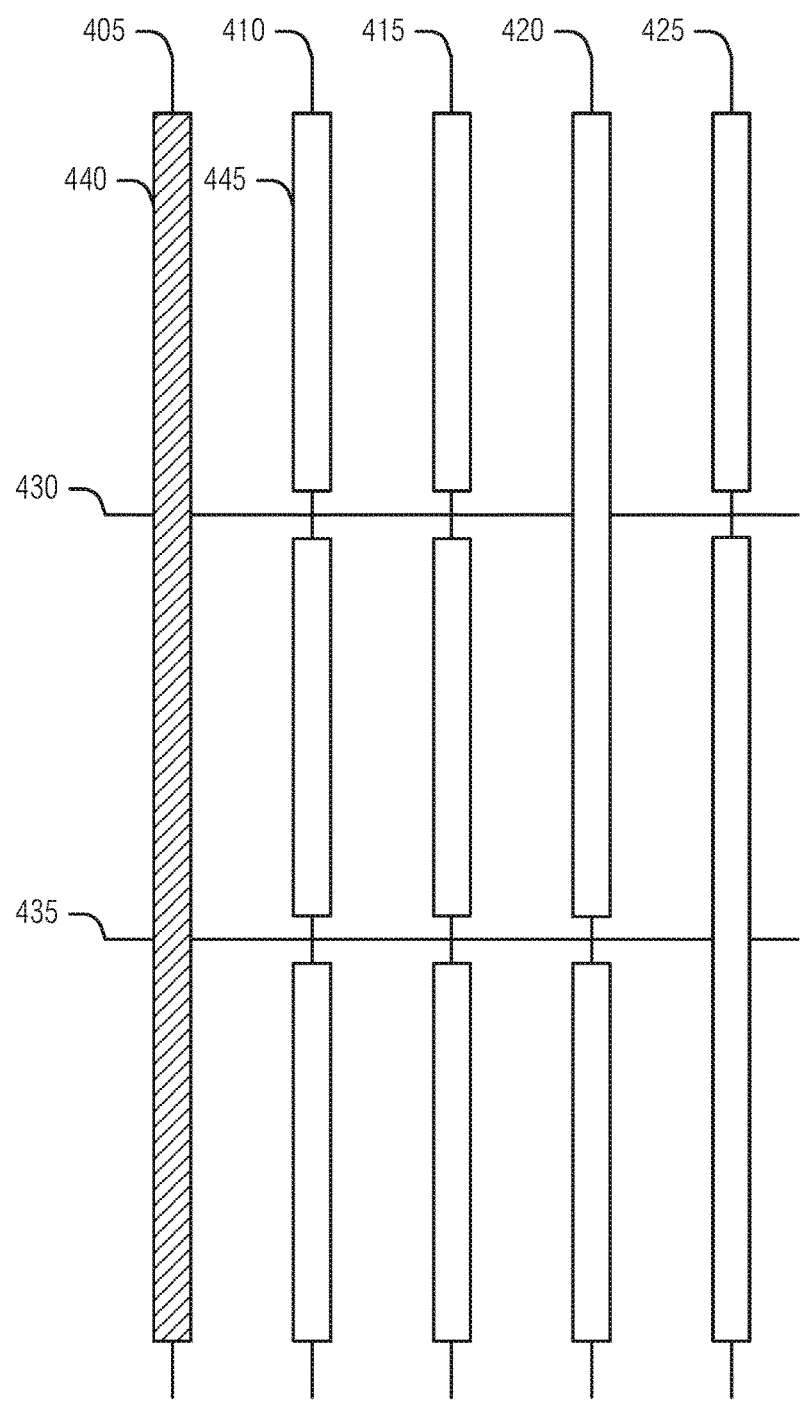
FIG. 4 illustrates an example resource and event diagram for a measurement group, according to an embodiment.

FIG. 4 illustrates an example resource and event diagram for a measurement group, according to an embodiment. FIG. 4 models a limited set of device resources 405, 410, 415, 420, and 425, each of which may support a single measurement collection. FIG. 4 also illustrates two state period boundaries 430 and 435 in which a state change to the device may affect a change to the current measurement group. The rectangles represent measurement collections. The operation of changing a current measurement group to a next measurement group while leaving unchanged measurement collection alone during a change is illustrated by the measurements 440 and 445 and the state period boundary 430. Note that the measurement 440 continues collecting across the boundary 430, indicating that it is in both measurement groups and is unaffected by the state change. In contrast, the measurement 445 is not in the next measurement group, so its data collection is terminated and replaced on resource 410 by a different measurement following the boundary 430. Again, as noted above, this dynamic modification preserves data collection contexts, such as a running average, for measurements unaffected by the state change and is different than the periodic updates present in some other techniques.

Figure 5:
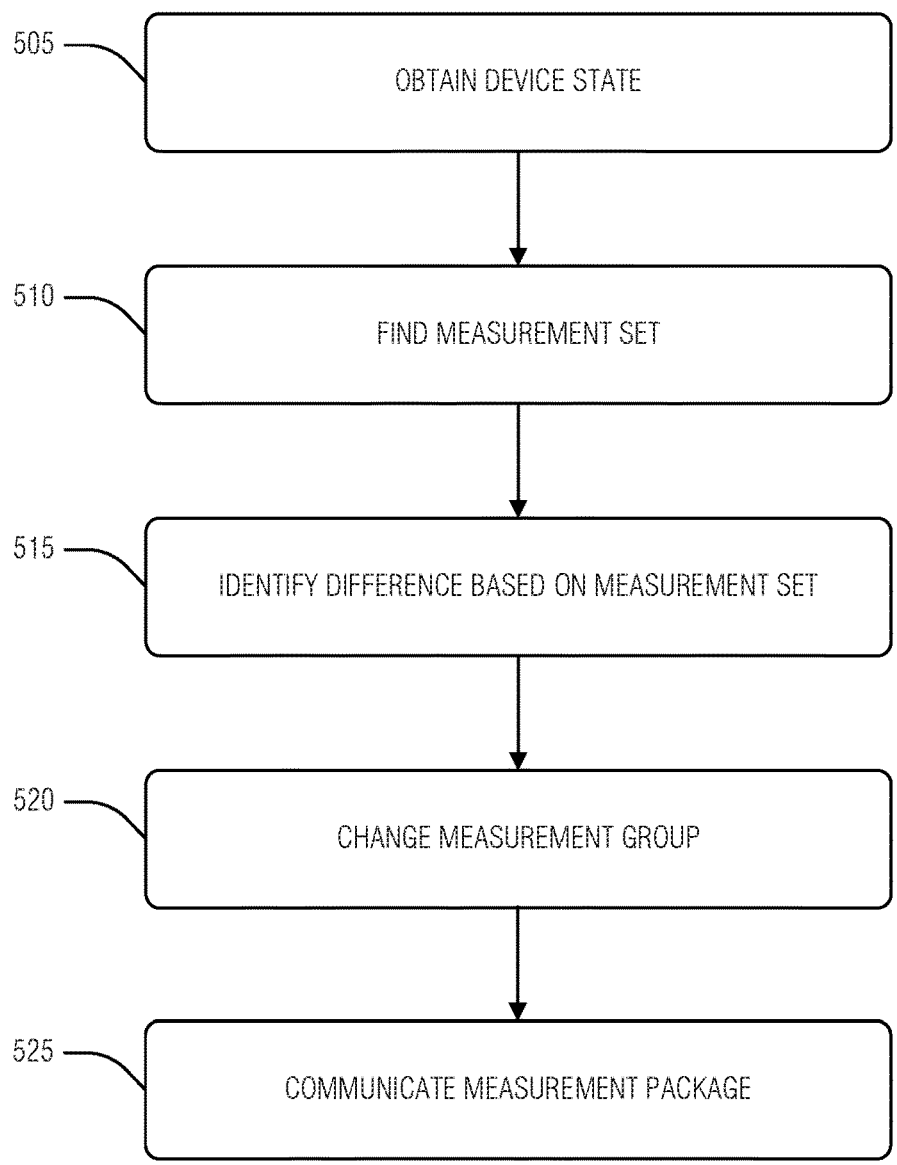
FIG. 5 illustrates a flow diagram of an example of a method for search dimensionality expansion, according to an embodiment.

FIG. 5 illustrates a flow diagram of an example of a method 500 for search dimensionality expansion, according to an embodiment. The operations of the method 500 are implemented in computer hardware, such as that described below with respect to FIG. 6 (e.g., circuits).

At operation 505, a device state is obtained from a sensor. This device measurement produces a device state related to one of a plurality of predetermined states, each indicative of a monitoring scenario. In an example, the sensor is interrupt driven. In an example, the sensor is poll driven.

In an example, the sensor is an environmental sensor arranged to measure an ambient condition of the device. In an example, the sensor is a user presence detector. Here, the measured state is a presence of a user. In an example, the presence detector is a camera and classifier. In an example, the camera is a depth camera. In an example, the sensor is at least one of a thermometer, ambient light detector, microphone, geographical positioning sensor (e.g., satellite navigation system), or radio.

In an example, the sensor is a hardware monitor. In an example, the hardware monitor is a component thermometer. In an example, the hardware monitor is a power meter. In an example, the hardware monitor is an interrupt. In an example, the sensor is a process monitor. In an example, the process monitor provides only a foreground process as output. In an example, the process monitor provides a ranked listing of processes. In an example, the ranked listing is ranked based on resource use of processes. In an example, the resource use is at least one of storage space, storage activity (e.g., reads or writes), system memory—colloquially referred to as "memory" and storing current system state rather than process data typically stored in a storage device—consumption, or processor utilization.

At operation 510, a measurement set is found (e.g., located) based on the state. In an example, the operation 510 includes receiving the state, searching a data store for a record including a component that matches the state and corresponds to the measurement set, and returning the measurement set. In an example, the record includes a set of states, at least one of which matches the state. The record may also include a class. Here, the record corresponds to the measurement set based on the class. That is, the state is matched to the set of states (e.g., is contained within the set) and the corresponding class is found. The class is then matched to a class corresponding to the measurement set, thus linking the measurement set and the state via the class.

At operation 515, a difference between the measurement set and a current measurement group are identified. In an example, identifying the difference set of measurements includes finding measurements in the measurement set that are not in the current measurement group. In an example, identifying the difference set of measurements includes finding measurements in the current measurement group that are not in the measurement set.

At operation 520, the current measurement group is changed with the difference identified in operation 515. The changed measurement group is here referred to as the next measurement group even if it is modified in place. In an example, changing the current measurement group with the difference set includes refraining from interrupting collection by measurements that do not change between the current measurement group and the next measurement group. This is referred to an "in place" modification of the measurement group as components that are not be changed (e.g., swapped in or out) remain unmolested in their activity during this process.

In an example, changing the current measurement group with the difference set includes adding, to the next measurement group, the measurements in the measurement set that are not in the current measurement group. In an example, changing the current measurement group with the difference set includes removing, from the next measurement group, the measurements in the current measurement group that are not in the measurement set.

The operations of the method 500 may be optionally extended to include comprising modifying the next measurement group based on a device load. In an example, modifying the next measurement group based on a device load includes removing at least one measurement from the next measurement group in response to the load being above a threshold. In an example, the at least one measurement is selected for removal based on a rank, each measurement in the next measurement group having a rank. In an example, the threshold is determined based on the state. In an example, modifying the next measurement group based on a device load includes adding at least one measurement to the next measurement group in response to the load being below a threshold.

At operation 525, a measurement package created during a sample period of the next measurement group is communicated to a remote controller. The operations of the method 500 may be optionally extended to include receiving an update to the measurement set, the update changing a list of measurements for the measurement set.

Figure 6:
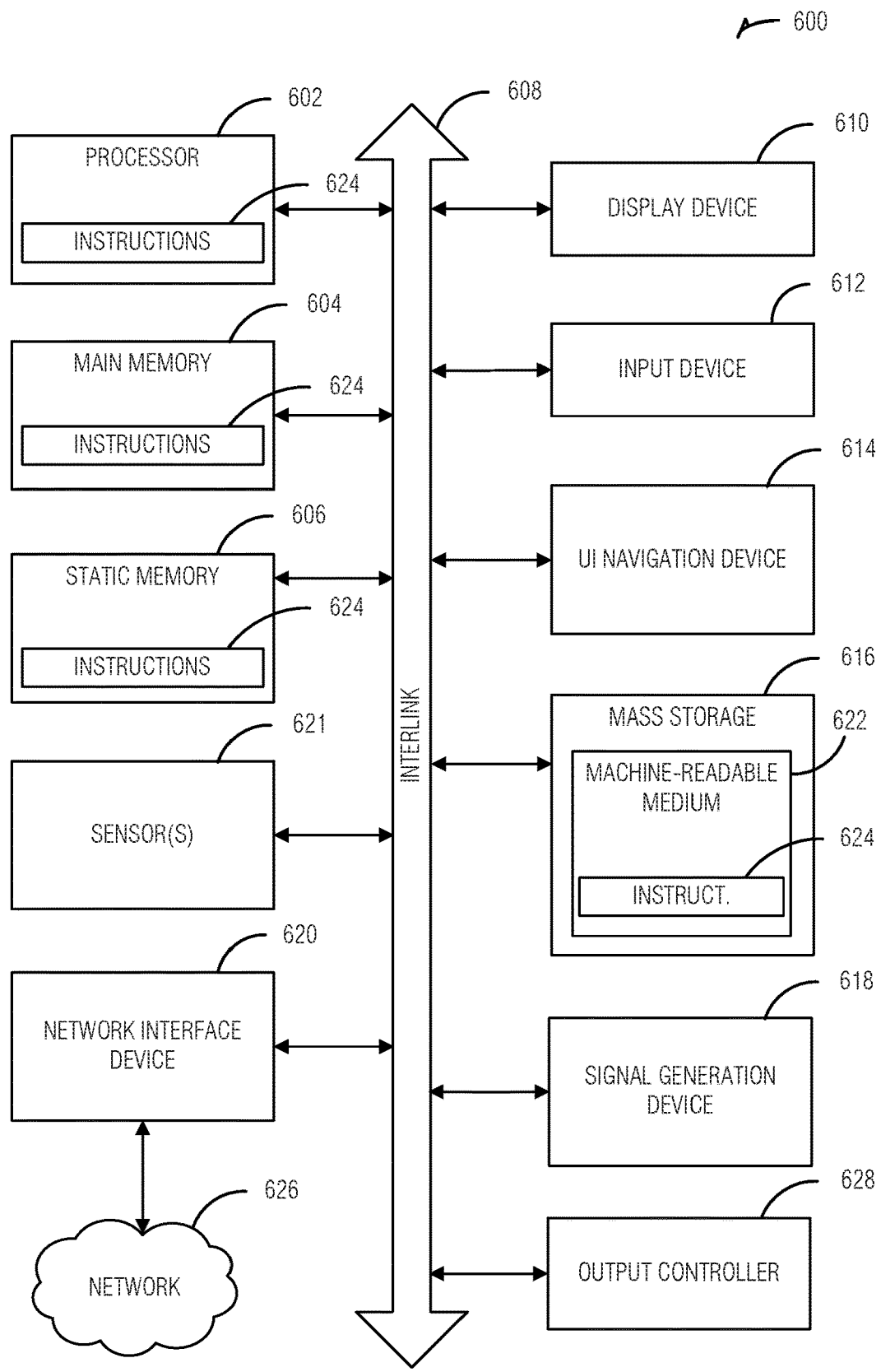
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Figure 7:
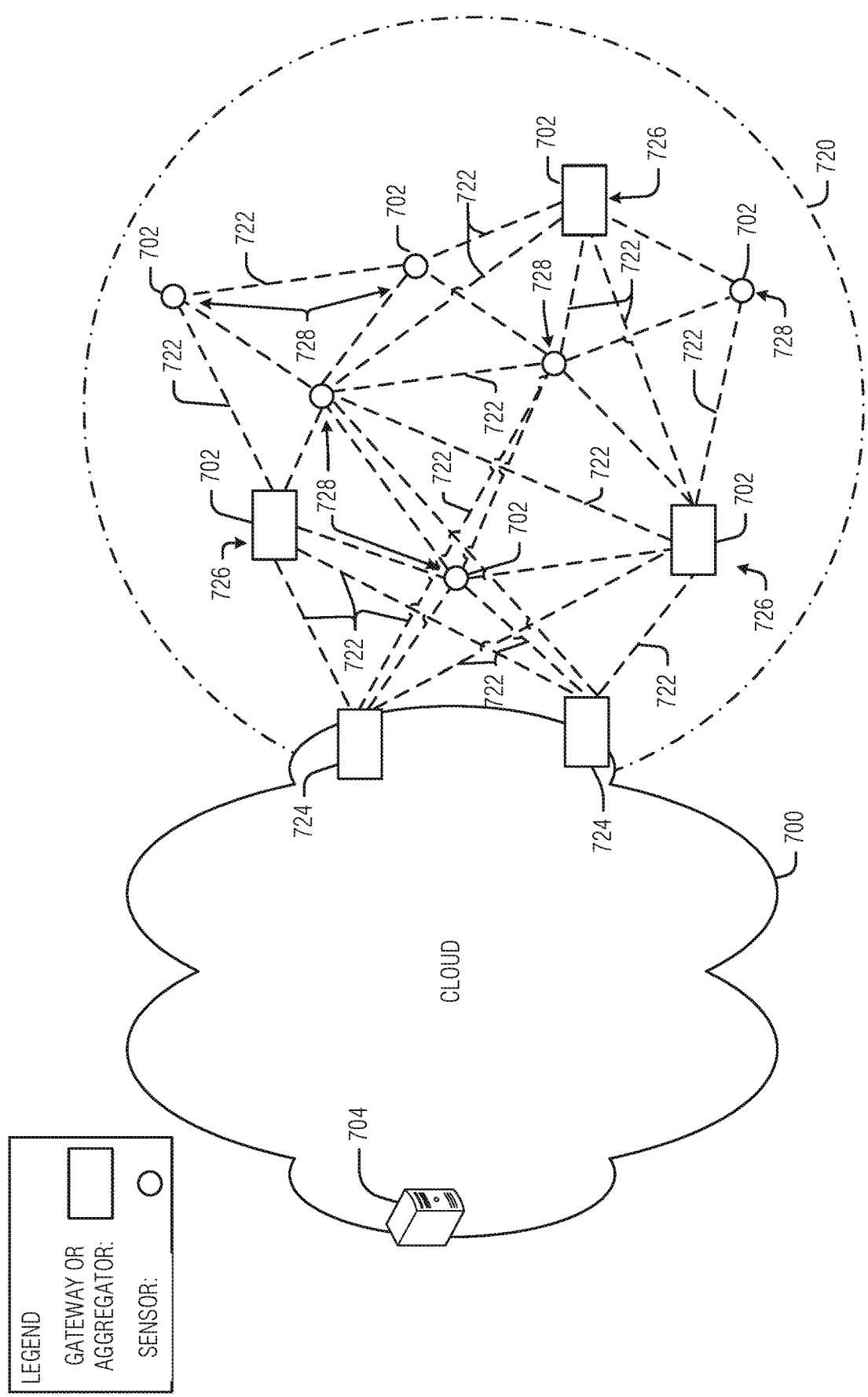
FIG. 7 illustrates a cloud and an IoT mesh network topology, according to an embodiment.

FIG. 7 is a drawing of a cloud computing network, or cloud 700, in communication with a mesh network of IoT devices 702, that may be termed a fog 720, operating at the edge of the cloud 700. To simplify the diagram, not every IoT device 702 is labeled. IoT communications between each other and cloud 700 services may be carried out in the manner illustrated by FIG. 3.

The fog 720 may be considered to be a massively interconnected network wherein a number of IoT devices 702 are in communications with each other, for example, by radio links 722. This may be performed using the open interconnect consortium (OIC) standard specification 3.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 702 are shown in this example, gateways 724, data aggregators 726, and sensors 728, although any combinations of IoT devices 702 and functionality may be used. The gateways 724 may be edge devices that provide communications between the cloud 700 and the fog 720, and may also provide the backend process function for data obtained from sensors 728, such as motion data, flow data, temperature data, and the like. The data aggregators 726 may collect data from any number of the sensors 728, and perform the back end processing function for the analysis. The results, raw data, or both may be passed along to the cloud 700 through the gateways 724. The sensors 728 may be full IoT devices 702, for example, capable of both collecting data and processing the data. In some cases, the sensors 728 may be more limited in functionality, for example, collecting the data and allowing the data aggregators 726 or gateways 724 to process the data.

Communications from any IoT device 702 may be passed along the most convenient path between any of the IoT devices 702 to reach the gateways 724. In these networks, the number of interconnections provide substantial redundancy, allowing communications to be maintained, even with the loss of a number of IoT devices 702. Further, the use of a mesh network may allow IoT devices 702 that are very low power or located at a distance from infrastructure to be used, as the range to connect to another IoT device 702 may be much less than the range to connect to the gateways 724.

The fog 720 of these IoT devices 702 devices may be presented to devices in the cloud 700, such as a server 704, as a single device located at the edge of the cloud 700, e.g., a fog 720 device. In this example, the alerts coming from the fog 720 device may be sent without being identified as coming from a specific IoT device 702 within the fog 720.

In some examples, the IoT devices 702 may be configured using an imperative programming style, e.g., with each IoT device 702 having a specific function and communication partners. However, the IoT devices 702 forming the fog 720 device may be configured in a declarative programming style, allowing the IoT devices 702 to reconfigure their operations and communications, such as to determine needed resources in response to conditions, queries, and device failures. As an example, a query from a user located at a server 704 about the operations of a subset of equiment monitored by the IoT devices 702 may result in the fog 720 device selecting the IoT devices 702, such as particular sensors 728, needed to answer the query. The data from these sensors 728 may then be aggregated and analyzed by any combination of the sensors 728, data aggregators 726, or gateways 724, before being sent on by the fog 720 device to the server 704 to answer the query. In this example, IoT devices 702 in the fog 720 may select the sensors 728 used based on the query, such as adding data from flow sensors or temperature sensors. Further, if some of the IoT devices 702 are not operational, other IoT devices 702 in the fog 720 device may provide analogous data, if available.

ADDITIONAL NOTES & EXAMPLES

Example 1 is a system for autonomously adaptive performance monitoring, the system comprising: a sensor receiver to measure a state of a device via a sensor; a search engine to locate a measurement set based on the state; a comparator to identify a difference set of measurements between a current measurement group and the measurement set; a controller to change the current measurement group with the difference set to create a next measurement group; and a transceiver to communicate, to a remote collector, a measurement package created during at least one sample period of the next measurement group.

In Example 2, the subject matter of Example 1 optionally includes wherein the sensor is an environmental sensor arranged to measure an ambient condition of the device.

In Example 3, the subject matter of Example 2 optionally includes wherein the sensor is a user presence detector, and wherein the state is a presence of a user.

In Example 4, the subject matter of Example 3 optionally includes wherein the presence detector is a camera and classifier.

In Example 5, the subject matter of Example 4 optionally includes wherein the camera is a depth camera.

In Example 6, the subject matter of any one or more of Examples 2-5 optionally include wherein the sensor is a thermometer.

In Example 7, the subject matter of any one or more of Examples 1-6 optionally include wherein the sensor is a hardware monitor.

In Example 8, the subject matter of Example 7 optionally includes wherein the hardware monitor is a component thermometer.

In Example 9, the subject matter of any one or more of Examples 7-8 optionally include wherein the sensor is a process monitor.

In Example 10, the subject matter of Example 9 optionally includes wherein the process monitor provides a foreground process.

In Example 11, the subject matter of any one or more of Examples 1-10 optionally include wherein the sensor is interrupt driven.

In Example 12, the subject matter of any one or more of Examples 1-11 optionally include wherein the sensor is poll driven.

In Example 13, the subject matter of any one or more of Examples 1-12 optionally include wherein to locate the measurement set includes the search engine to: receive the state; search a data store for a record including a component that matches the state and corresponds to the measurement set; and return the measurement set.

In Example 14, the subject matter of Example 13 optionally includes wherein the record includes a set of states, at least one of which matching the state, and a class, and wherein the record corresponds to the measurement set based on the class.

In Example 15, the subject matter of any one or more of Examples 1-14 optionally include wherein to identify the difference set of measurements includes the comparator to find measurements in the measurement set that are not in the current measurement group.

In Example 16, the subject matter of Example 15 optionally includes wherein to change the current measurement group with the difference set includes the controller to add, to the next measurement group, the measurements in the measurement set that are not in the current measurement group.

In Example 17, the subject matter of any one or more of Examples 1-16 optionally include wherein to identify the difference set of measurements includes the comparator to find measurements in the current measurement group that are not in the measurement set.

In Example 18, the subject matter of any one or more of Examples 16-17 optionally include wherein to change the current measurement group with the difference set includes the controller to remove, from the next measurement group, the measurements in the current measurement group that are not in the measurement set.

In Example 19, the subject matter of any one or more of Examples 1-18 optionally include wherein to change the current measurement group with the difference set includes the controller to refrain from interrupting collection by measurements that do not change between the current measurement group and the next measurement group.

In Example 20, the subject matter of any one or more of Examples 1-19 optionally include wherein the controller is to modify the next measurement group based on a device load.

In Example 21, the subject matter of Example 20 optionally includes wherein the controller is to remove at least one measurement from the next measurement group in response to the load being above a threshold.

In Example 22, the subject matter of Example 21 optionally includes wherein the at least one measurement is selected for removal based on a rank, each measurement in the next measurement group having a rank.

In Example 23, the subject matter of any one or more of Examples 21-22 optionally include wherein the threshold is determined based on the state.

In Example 24, the subject matter of any one or more of Examples 21-23 optionally include wherein the controller is to add at least one measurement to the next measurement group in response to the load being below a threshold.

In Example 25, the subject matter of any one or more of Examples 1-24 optionally include wherein the transceiver is to receive an update to the measurement set, the update changing a list of measurements for the measurement set.

Example 26 is a method for autonomously adaptive performance monitoring, the method comprising: measuring a state of a device by a sensor; locating a measurement set based on the state; identifying a difference set of measurements between a current measurement group and the measurement set; changing the current measurement group with the difference set to create a next measurement group; and communicating, to a remote collector, a measurement package created during at least one sample period of the next measurement group.

In Example 27, the subject matter of Example 26 optionally includes wherein the sensor is an environmental sensor arranged to measure an ambient condition of the device.

In Example 28, the subject matter of Example 27 optionally includes wherein the sensor is a user presence detector, and wherein the state is a presence of a user.

In Example 29, the subject matter of Example 28 optionally includes wherein the presence detector is a camera and classifier.

In Example 30, the subject matter of Example 29 optionally includes wherein the camera is a depth camera.

In Example 31, the subject matter of any one or more of Examples 27-30 optionally include wherein the sensor is a thermometer.

In Example 32, the subject matter of any one or more of Examples 26-31 optionally include wherein the sensor is a hardware monitor.

In Example 33, the subject matter of Example 32 optionally includes wherein the hardware monitor is a component thermometer.

In Example 34, the subject matter of any one or more of Examples 26-33 optionally include wherein the sensor is a process monitor.

In Example 35, the subject matter of Example 34 optionally includes wherein the process monitor provides a foreground process.

In Example 36, the subject matter of any one or more of Examples 26-35 optionally include wherein the sensor is interrupt driven.

In Example 37, the subject matter of any one or more of Examples 26-36 optionally include wherein the sensor is poll driven.

In Example 38, the subject matter of any one or more of Examples 26-37 optionally include locating the measurement set includes: receiving the state; searching a data store for a record including a component that matches the state and corresponds to the measurement set; and returning the measurement set.

In Example 39, the subject matter of Example 38 optionally includes wherein the record includes a set of states, at least one of which matching the state, and a class, and wherein the record corresponds to the measurement set based on the class.

In Example 40, the subject matter of any one or more of Examples 26-39 optionally include wherein identifying the difference set of measurements includes finding measurements in the measurement set that are not in the current measurement group.

In Example 41, the subject matter of Example 40 optionally includes wherein changing the current measurement group with the difference set includes adding, to the next measurement group, the measurements in the measurement set that are not in the current measurement group.

In Example 42, the subject matter of any one or more of Examples 26-41 optionally include wherein identifying the difference set of measurements includes finding measurements in the current measurement group that are not in the measurement set.

In Example 43, the subject matter of any one or more of Examples 41-42 optionally include wherein the changing the current measurement group with the difference set includes removing, from the next measurement group, the measurements in the current measurement group that are not in the measurement set.

In Example 44, the subject matter of any one or more of Examples 26-43 optionally include wherein the changing the current measurement group with the difference set includes refraining from interrupting collection by measurements that do not change between the current measurement group and the next measurement group.

In Example 45, the subject matter of any one or more of Examples 26-44 optionally include modifying the next measurement group based on a device load.

In Example 46, the subject matter of Example 45 optionally includes wherein modifying the next measurement group based on a device load includes removing at least one measurement from the next measurement group in response to the load being above a threshold.

In Example 47, the subject matter of Example 46 optionally includes wherein the at least one measurement is selected for removal based on a rank, each measurement in the next measurement group having a rank.

In Example 48, the subject matter of any one or more of Examples 46-47 optionally include wherein the threshold is determined based on the state.

In Example 49, the subject matter of any one or more of Examples 46-48 optionally include wherein modifying the next measurement group based on a device load includes adding at least one measurement to the next measurement group in response to the load being below a threshold.

In Example 50, the subject matter of any one or more of Examples 26-49 optionally include receiving an update to the measurement set, the update changing a list of measurements for the measurement set.

Example 51 is a system comprising means to perform any method of
Examples 26-50.

Example 52 is at least one machine readable medium including instructions that, when executed by a machine, cause the machine to perform any method of Examples 26-50.

Example 53 is a system for autonomously adaptive performance monitoring, the system comprising: means for measuring a state of a device by a sensor; means for locating a measurement set based on the state; means for identifying a difference set of measurements between a current measurement group and the measurement set; means for changing the current measurement group with the difference set to create a next measurement group; and means for communicating, to a remote collector, a measurement package created during at least one sample period of the next measurement group.

In Example 54, the subject matter of Example 53 optionally includes wherein the sensor is an environmental sensor arranged to measure an ambient condition of the device.

In Example 55, the subject matter of Example 54 optionally includes wherein the sensor is a user presence detector, and wherein the state is a presence of a user.

In Example 56, the subject matter of Example 55 optionally includes wherein the presence detector is a camera and classifier.

In Example 57, the subject matter of Example 56 optionally includes wherein the camera is a depth camera.

In Example 58, the subject matter of any one or more of Examples 54-57 optionally include wherein the sensor is a thermometer.

In Example 59, the subject matter of any one or more of Examples 53-58 optionally include wherein the sensor is a hardware monitor.

In Example 60, the subject matter of Example 59 optionally includes wherein the hardware monitor is a component thermometer.

In Example 61, the subject matter of any one or more of Examples 59-60 optionally include wherein the sensor is a process monitor.

In Example 62, the subject matter of Example 61 optionally includes wherein the process monitor provides a foreground process.

In Example 63, the subject matter of any one or more of Examples 53-62 optionally include wherein the sensor is interrupt driven.

In Example 64, the subject matter of any one or more of Examples 53-63 optionally include wherein the sensor is poll driven.

In Example 65, the subject matter of any one or more of Examples 53-64 optionally include wherein the means for locating the measurement set include: means for receiving the state; means for searching a data store for a record including a component that matches the state and corresponds to the measurement set; and means for returning the measurement set.

In Example 66, the subject matter of Example 65 optionally includes wherein the record includes a set of states, at least one of which matching the state, and a class, and wherein the record corresponds to the measurement set based on the class.

In Example 67, the subject matter of any one or more of Examples 53-66 optionally include wherein the means for identifying the difference set of measurements includes means for finding measurements in the measurement set that are not in the current measurement group.

In Example 68, the subject matter of Example 67 optionally includes wherein the means for changing the current measurement group with the difference set includes means for adding, to the next measurement group, the measurements in the measurement set that are not in the current measurement group.

In Example 69, the subject matter of any one or more of Examples 53-68 optionally include wherein the means for identifying the difference set of measurements includes means for finding measurements in the current measurement group that are not in the measurement set.

In Example 70, the subject matter of any one or more of Examples 68-69 optionally include wherein the means for changing the current measurement group with the difference set includes means for removing, from the next measurement group, the measurements in the current measurement group that are not in the measurement set.

In Example 71, the subject matter of any one or more of Examples 53-70 optionally include wherein the means for changing the current measurement group with the difference set includes means for refraining from interrupting collection by measurements that do not change between the current measurement group and the next measurement group.

In Example 72, the subject matter of any one or more of Examples 53-71 optionally include means for modifying the next measurement group based on a device load.

In Example 73, the subject matter of Example 72 optionally includes wherein the means for modifying the next measurement group based on a device load includes means for removing at least one measurement from the next measurement group in response to the load being above a threshold.

In Example 74, the subject matter of Example 73 optionally includes wherein the at least one measurement is selected for removal based on a rank, each measurement in the next measurement group having a rank.

In Example 75, the subject matter of any one or more of Examples 73-74 optionally include wherein the threshold is determined based on the state.

In Example 76, the subject matter of any one or more of Examples 73-75 optionally include wherein the means for modifying the next measurement group based on a device load includes means for adding at least one measurement to the next measurement group in response to the load being below a threshold.

In Example 77, the subject matter of any one or more of Examples 53-76 optionally include means for receiving and storing an update to the measurement set, the update changing a list of measurements for the measurement set.

Example 78 is at least one machine readable medium including instructions that, when executed by a machine, cause the machine to: measure a state of a device with a sensor; locate a measurement set based on the state; identify a difference set of measurements between a current measurement group and the measurement set; change the current measurement group with the difference set to create a next measurement group; and communicate, to a remote collector, a measurement package created during at least one sample period of the next measurement group.

In Example 79, the subject matter of Example 78 optionally includes wherein the sensor is an environmental sensor arranged to measure an ambient condition of the device.

In Example 80, the subject matter of Example 79 optionally includes wherein the sensor is a user presence detector, and wherein the state is a presence of a user.

In Example 81, the subject matter of Example 80 optionally includes wherein the presence detector is a camera and classifier.

In Example 82, the subject matter of Example 81 optionally includes wherein the camera is a depth camera.

In Example 83, the subject matter of any one or more of Examples 79-82 optionally include wherein the sensor is a thermometer.

In Example 84, the subject matter of any one or more of Examples 78-83 optionally include wherein the sensor is a hardware monitor.

In Example 85, the subject matter of Example 84 optionally includes wherein the hardware monitor is a component thermometer.

In Example 86, the subject matter of any one or more of Examples 84-85 optionally include wherein the sensor is a process monitor.

In Example 87, the subject matter of Example 86 optionally includes wherein the process monitor provides a foreground process.

In Example 88, the subject matter of any one or more of Examples 78-87 optionally include wherein the sensor is interrupt driven.

In Example 89, the subject matter of any one or more of Examples 78-88 optionally include wherein the sensor is poll driven.

In Example 90, the subject matter of any one or more of Examples 78-89 optionally include wherein to locate the measurement set includes the machine to: receive the state; search a data store for a record including a component that matches the state and corresponds to the measurement set; and return the measurement set.

In Example 91, the subject matter of Example 90 optionally includes wherein the record includes a set of states, at least one of which matching the state, and a class, and wherein the record corresponds to the measurement set based on the class.

In Example 92, the subject matter of any one or more of Examples 78-91 optionally include wherein to identify the difference set of measurements includes the machine to find measurements in the measurement set that are not in the current measurement group.

In Example 93, the subject matter of Example 92 optionally includes wherein to change the current measurement group with the difference set includes the machine to add, to the next measurement group, the measurements in the measurement set that are not in the current measurement group.

In Example 94, the subject matter of any one or more of Examples 78-93 optionally include wherein to identify the difference set of measurements includes the machine to find measurements in the current measurement group that are not in the measurement set.

In Example 95, the subject matter of any one or more of Examples 93-94 optionally include wherein to change the current measurement group with the difference set includes the machine to remove, from the next measurement group, the measurements in the current measurement group that are not in the measurement set.

In Example 96, the subject matter of any one or more of Examples 78-95 optionally include wherein to change the current measurement group with the difference set includes the machine to refrain from interrupting collection by measurements that do not change between the current measurement group and the next measurement group.

In Example 97, the subject matter of any one or more of Examples 78-96 optionally include wherein the controller is to modify the next measurement group based on a device load.

In Example 98, the subject matter of Example 97 optionally includes wherein the controller is to remove at least one measurement from the next measurement group in response to the load being above a threshold.

In Example 99, the subject matter of Example 98 optionally includes wherein the at least one measurement is selected for removal based on a rank, each measurement in the next measurement group having a rank.

In Example 100, the subject matter of any one or more of Examples 98-99 optionally include wherein the threshold is determined based on the state.

In Example 101, the subject matter of any one or more of Examples 98-100 optionally include wherein the controller is to add at least one measurement to the next measurement group in response to the load being below a threshold.

In Example 102, the subject matter of any one or more of Examples 78-101 optionally include wherein the transceiver is to receive an update to the measurement set, the update changing a list of measurements for the measurement set.

The above detailed description includes references to the accompanying drawings, which form a part of the detailed description. The drawings show, by way of illustration, specific embodiments that may be practiced.

These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for autonomously adaptive performance monitoring, the system comprising:
   a sensor receiver to measure a state of a device via a sensor;
   a search engine to locate a measurement set based on the state;
   a comparator to identify a difference set of measurements between a current measurement group and the measurement set;
   a controller to change the current measurement group with the difference set to create a next measurement group, wherein to change the current measurement group, the controller adds a first measurement to the current measurement group and removes a second measurement to the current measurement group, wherein a size of the next measurement group is based on a device load by removing an additional measurement in response to the device load being above a threshold or adding the additional measurement in response to the device load being below the threshold; and
   a transceiver to communicate, to a remote collector, a measurement package created during at least one sample period of the next measurement group.

2. The system of claim 1, wherein the sensor is an environmental sensor arranged to measure an ambient condition of the device.

3. The system of claim 2, wherein the sensor is a user presence detector, and wherein the state is a presence of a user.

4. The system of claim 1, wherein the sensor is a hardware monitor.

5. The system of claim 4, wherein the sensor is a process monitor.

6. The system of claim 1, wherein to locate the measurement set includes the search engine to:
   receive the state;
   search a data store for a record including a component that matches the state and corresponds to the measurement set; and
   return the measurement set.

7. The system of claim 6, wherein the record includes a set of states, at least one of which matching the state, and a class, and wherein the record corresponds to the measurement set based on the class.

8. The system of claim 1, wherein the additional measurement is selected for addition or removal based on a rank, measurements having a rank based on at least one of historical use, a defined importance value, or resource utilization.

9. A method for autonomously adaptive performance monitoring, the method comprising:
  measuring a state of a device by a sensor;
  locating a measurement set based on the state; identifying a difference set of measurements between a current measurement group and the measurement set;
  changing the current measurement group with the difference set to create a next measurement group, wherein changing the current measurement group includes adding a first measurement to the current measurement group and removing a second measurement to the current measurement group, wherein a size of the next measurement group is based on a device load by removing an additional measurement in response to the device load being above a threshold or adding the additional measurement in response to the device load being below the threshold; and
  communicating, to a remote collector, a measurement package created during at least one sample period of the next measurement group.

10. The method of claim 9, wherein the sensor is an environmental sensor arranged to measure an ambient condition of the device.

11. The method of claim 10, wherein the sensor is a user presence detector, and wherein the state is a presence of a user.

12. The method of claim 9, wherein the sensor is a hardware monitor.

13. The method of claim 9, wherein the sensor is a process monitor.

14. The method of claim 9, locating the measurement set includes:
  receiving the state;
  searching a data store for record including a component that matches the state and corresponds to the measurement set; and
  returning the measurement set.

15. The method of claim 14, wherein the record includes a set of states, at least one of which matching the state, and a class, and wherein the record corresponds to the measurement set based on the class.

16. The method of claim 9, wherein the additional measurement is selected for addition or removal based on a rank, measurements having a rank based on at least one of historical use, a defined importance value, or resource utilization.

17. At least one non-transitory machine readable medium including instructions that, when executed by a machine, cause the machine to:
  measure a state of a device with a sensor;
  locate a measurement set based on the state;
  identify a difference set of measurements between a current measurement group and the measurement set;
  change the current measurement group with the difference set to create a next measurement group, wherein to change the current measurement group. a first measurement is added to the current measurement group and a second measurement is removed from the current measurement group, wherein a size of the next measurement group is based on a device load by removing an additional measurement in response to the device load being above a threshold or adding the additional measurement in response to the device load being below the threshold; and
  communicate, to a remote collector, a measurement package created during at least one sample period of the next measurement group.

18. The at least one non-transitory machine readable medium of claim 17, wherein the sensor is an environmental sensor arranged to measure an ambient condition of the device.

19. The at least one non-transitory machine readable medium of claim 18, wherein the sensor is a user presence detector, and wherein the state is a presence of a user.

20. The at least one non-transitory machine readable medium of claim 17, wherein the sensor is a hardware monitor.

21. The at least one non-transitory machine readable medium of claim 20, wherein the sensor is a process monitor.

22. The at least one non-transitory machine readable medium of claim 17, wherein to locate the measurement set includes the machine to:
  receive the state;
  search a data store for a record including a component that matches the state and corresponds to the measurement set; and
  return the measurement set.

23. The at least one non-transitory machine readable medium of claim 22, wherein the record includes a set of states, at least one of which matching the state, and a class, and wherein the record corresponds to the measurement set based on the class.

24. The at least one non-transitory machine readable medium of claim 17, wherein the additional measurement is selected for addition or removal based on a rank, measurements having a rank based on at least one of historical use, a defined importance value, or resource utilization.

* * * * *

UNITED STATES PATENT AND TRADEMARK OFFICE
CERTIFICATE OF CORRECTION

| | | |
|---|---|---|
| PATENT NO. | : 10,983,894 B2 | Page 1 of 1 |
| APPLICATION NO. | : 16/306002 | |
| DATED | : April 20, 2021 | |
| INVENTOR(S) | : Tayeb et al. | |

It is certified that error appears in the above-identified patent and that said Letters Patent is hereby corrected as shown below:

On the Title Page

In item (71), in "Applicants", in Column 1, Lines 1-4, delete "Applicants: Intel Corporation, Santa Clara, CA (US); Jamel Tayeb, Beaverton, OR (US); Robert F. Kwasnick, Palo Alto, CA (US)" and insert --Applicant: Intel Corporation, Santa Clara, CA (US)-- therefor In the Claims In Column 23, Line 9, in Claim 9, after "state;", insert a line break In Column 23, Line 40, in Claim 14, after "for", insert --a--

In Column 24, Line 10, in Claim 17, delete "group." and insert --group,-- therefor Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*